United States Patent [19]

Kotzur

[11] Patent Number: 4,555,117
[45] Date of Patent: Nov. 26, 1985

[54] LIQUID SHAFT PACKING HAVING A REDUCED SLIDE RING TEMPERATURE

[75] Inventor: Joachim Kotzur, Oberhausen, Fed. Rep. of Germany

[73] Assignee: M.A.N. Maschinenfabrik Augsburg-Nürnberg AG, Fed. Rep. of Germany

[21] Appl. No.: 635,905

[22] Filed: Jul. 30, 1984

[30] Foreign Application Priority Data

Aug. 11, 1983 [DE] Fed. Rep. of Germany ....... 3329034

[51] Int. Cl.[4] .................... F16J 15/34; F16J 15/40
[52] U.S. Cl. ................................. 277/173; 277/26; 277/59; 277/96.2
[58] Field of Search .......... 277/26, 59, 65, 96, 277/96.2, 173, 174, 96.1, DIG. 6

[56] References Cited

U.S. PATENT DOCUMENTS

| | | | |
|---|---|---|---|
| 1,993,268 | 3/1935 | Ferguson | 277/65 X |
| 2,151,410 | 3/1939 | Richter | 277/26 |
| 2,407,218 | 9/1946 | Beier | 277/65 X |
| 2,425,209 | 8/1947 | Snyder et al. | 277/96.2 |
| 2,531,079 | 11/1950 | Payne | 277/96.2 X |
| 2,831,713 | 4/1958 | Smith | 277/65 |
| 2,995,390 | 8/1961 | Gardner | 277/26 |
| 3,218,085 | 11/1965 | Grace | 277/59 |
| 3,260,530 | 7/1966 | Jelatis et al. | 277/65 X |
| 4,174,844 | 11/1979 | Zobens | 277/96.2 X |
| 4,199,152 | 4/1980 | Catterfeld | 277/173 X |

FOREIGN PATENT DOCUMENTS 636647  2/1962  Canada ................... 277/65

Primary Examiner—Robert S. Ward
Attorney, Agent, or Firm—McGlew and Tuttle

[57] ABSTRACT

A liquid packing for shafts comprises a seal ring rotating at the machine speed, and a non-rotating seal ring which is tightly fitted to the housing and axially yielding. The rotating ring is made of a material of high thermal conductivity, high strength and surface hardness in the sealing area. The rotating ring carries one or more floating rings, with a sealing gap concentric with the shaft being formed therebetween. The rotating ring is made of a hardened copper beryllium alloy, the non-rotating ring of slide carbon.

1 Claim, 1 Drawing Figure

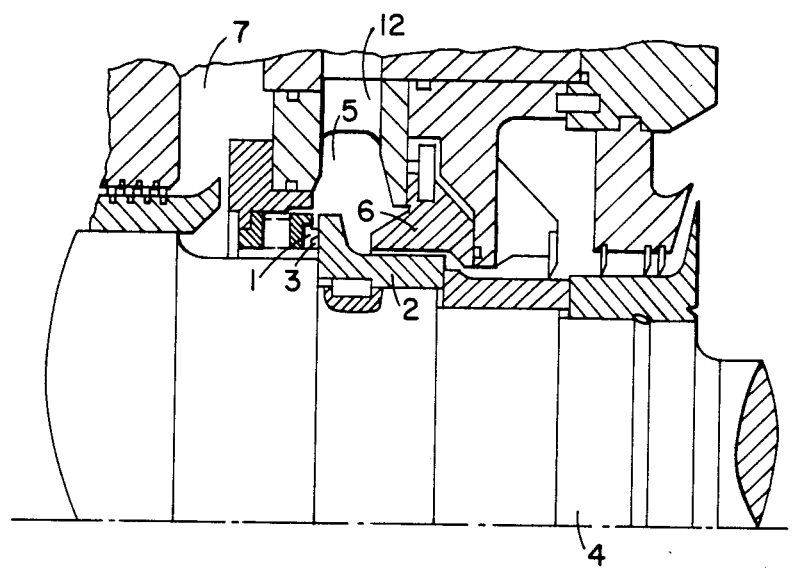

LIQUID SHAFT PACKING HAVING A REDUCED SLIDE RING TEMPERATURE

FIELD AND BACKGROUND OF THE INVENTION

This invention relates in general to rotating part seals and in particular to a new and useful liquid packing for shafts.

Shaft packings are employed for sealing the gap between the rotating shaft and the housing of fluid-power machines for compressing and expanding gases. The great heat produced by the friction between the rotating and the non-rotating seal ring due to the needed contact pressure therebetween must be dissipated, in a manner known per se, by unilaterally cooling the seal rings with packing fluid. To a small extent, some of the packing fluid leaking under excess pressure through the gap between the seal rings and the gas space and mainly lubricating the sliding surfaces of the seal rings, also contributes to the heat removal.

In prior art designs, the non-rotating seal ring is made of carbon, for example, and the rotating seal ring is usually made of steel with a great hardness of the sliding surface, such as stellite or chrome steel in order to obtain a satisfactory sliding, and a high strength at the same time.

With high speeds and surface pressures, the temperatures of the slide rings may rise to such extremes that the packing liquid, such as oil, decomposes on the slide surface and forms undesirable deposits which increase the leak into the gas space.

SUMMARY OF THE INVENTION

The invention is directed to improving prior art shaft packings so as to reduce the temperatures in the seal gap.

In accordance with the invention the liquid packing for a shaft comprises a seal ring rotating at a speed of the machine and a non-rotating seal ring which is tightly fitted to the housing and is axially yieldably movable. The rotating seal ring is made of a material of high thermal conductivity having high strength and tearing length and a high surface hardness in the sealing area which is filled with liquid. The hardened copper beryllium alloy has proved particularly satisfactory for the rotating seal ring. The rotary ring may also be made of aluminum or an aluminum alloy, such as AlMg 3 with an oxidized surface.

The non-rotating seal ring may be made of usual materials, especially a non-rotating slide ring of hard-burned carbon has proved particularly satisfactory. Tests have shown that this combination of materials results in very good sliding properties and also reduces leaks (no deposits).

The rotating ring rotates within a bushing, termed a floating ring, which floats on a film of cooling liquid and in which the cooling liquid pressure is reduced to the pressure applied to the floating ring from the outside, i.e. in general the atmospheric pressure. The intense stream of cooling liquid through the floating ring removes not only the frictional heat produced in the floating ring itself, but also, due to the good thermal conductivity of the floating ring, removes heat from the region of the rotating slide ring.

Accordingly, it is an object of the invention to provide a liquid packing of a shaft comprising a seal ring which rotates at a speed of the machine and a non-rotating seal ring which is tightly fitted to the housing and is axially displaceable under stress and wherein the rotatable seal ring is made of a material of high thermal conductivity and high strength and has a high surface hardness sealing surface.

A further object of the invention is to provide a liquid packing of a shaft which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention are illustrated.

BRIEF DESCRIPTION OF THE DRAWING

In the drawing:

The FIGURE is a partial axial sectional view of a rotating shaft having a liquid packing constructed in accordance with the invention.

DESCRIPTION OF THE PREFERRED EMBODIMENTS

Referring to the drawings in particular, the invention embodied therein comprises a liquid packing of a shaft 4 which includes a rotating seal ring 2 disposed alongside a non-rotating seal ring 1 in a liquid seal space or chamber 5.

In the embodiment of FIG. 1 a slide ring 1 of carbon is pressed axially against a seal ring 2 of copper-beryllium rotating with the shaft. The frictional heat produced in a seal gap 3 between the slide ring and the seal ring is dissipated to only a small extent through the carbon ring 1, but to a high extent through the rotating ring 2, to shaft 4, to the packing liquid (oil in the present example) received in a chamber 5, and to a floating ring 6.

The packing oil flowing into chamber 5 through bores 12 is partly recycled for cooling, i.e. removed from the chamber directly through bores 12 provided at other locations of the circumference. A major part of the oil, however, flows past floating ring 6 to the atmospheric side. A very small amount of leak oil passes through seal gap 3 to the gas space 7.

While specific embodiments of the invention have been shown and described in detail to illustrate the application of the principles of the invention, it will be understood that the invention may be embodied otherwise without departing from such principles.

What is claimed is:

1. A liquid packing for a rotating shaft, comprising a seal ring adapted to be connected to the shaft for rotating with the shaft at the same speed thereof, and a housing accommodating said shaft, a non-rotating seal ring tightly fitted to said housing and being axially displaceable under stress, said rotating seal ring being made of a material of high thermal conductivity and high strength having a high sealing surface with high surface hardness, and including at least one floating ring disposed around said rotating seal ring and defining a seal gap with said rotating seal ring which is concentric with the axis of said shaft.

* * * * *